E. BOESNER.
BELT DRIVE.
APPLICATION FILED NOV. 9, 1911.
1,053,564.
Patented Feb. 18, 1913.
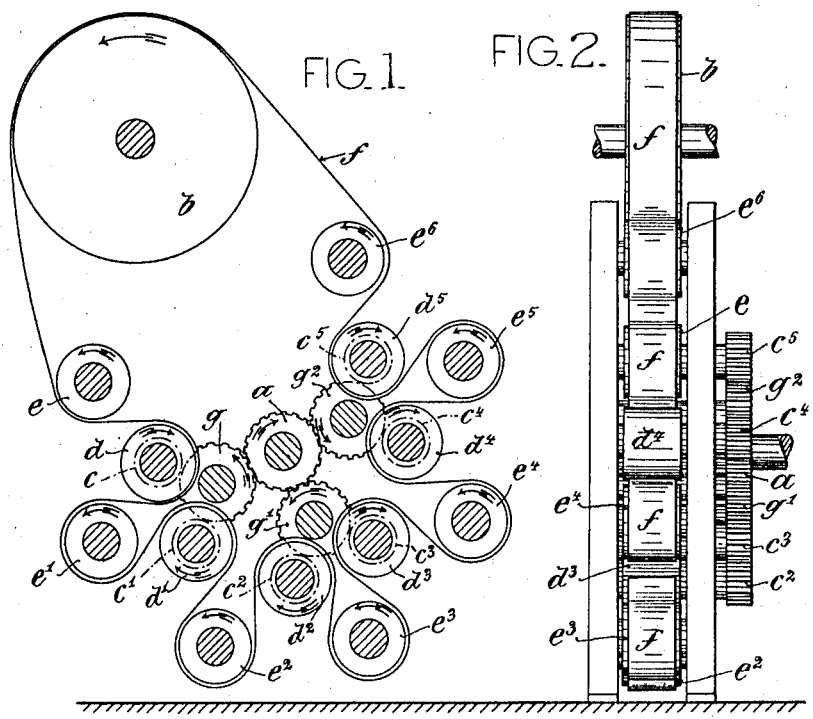
Witnesses:
Inventor:
Emma Boesner
by B. Singer
Attorney.

UNITED STATES PATENT OFFICE.

EMMA BOESNER, OF LONGEVILLE, NEAR METZ, GERMANY.

BELT-DRIVE.

1,053,564.   Specification of Letters Patent.   Patented Feb. 18, 1913.

Application filed November 9, 1911. Serial No. 659,403.

*To all whom it may concern:*

Be it known that I, EMMA BOESNER, a subject of the German Emperor, and residing at Longeville, near Metz, Germany, have invented certain new and useful Improvements in Belt-Drives, of which the following is a specification.

In belt drives adapted to receive motion and power at high speed from a motor or to transfer the same to machinery, the safety of the operation is often impaired by too much straining of the belt. The strain on the belt may result from the fact that the diameter of the driven or driving pulley is limited by adjacent structures or mechanism, number of revolutions or circumferential velocity, and, on the other hand, the width of the belt in many instances, being limited. This disadvantage can be obviated, and in fact the construction of the belt drive be made much more convenient if in the pair of pulleys either the power transmitting pulley or the receiving pulley is replaced by a plurality of belt pulleys, which are arranged in a circle around the motor shaft or the main driving shaft of the engine respectively, and are connected with each other by means of belts (idlers being employed if necessary or desirable) in such a manner that each of these pulleys transmits only part of the power to or from the shaft by means of an interposed driving mechanism, for instance a friction wheel drive. A transmission gearing or shafting can also be connected to the drive.

In the drawing: Figure 1 is a side view, with portions in section, illustrating one form of my invention. Fig. 2 is an edge view thereof.

In the form illustrated in the drawing, the journal frame is not shown in order to show the arrangement more clearly, and owing to lack of space the driving pulley $b$ is shown small in comparison with the other pulleys. Motion and power are transmitted from the pulley $b$ to the gear wheel $a$, which is secured to the main shaft of a machine. The power is transmitted by means of the belt $f$ led over the idler pulleys $e$, $e^1$, $e^2$, $e^3$, $e^4$, $e^5$, and $e^6$ to the pulleys $d$, $d^1$, $d^2$, $d^3$, $d^4$, $d^5$, which by means of the gear wheels $c$, $c^1$, $c^2$, $c^3$, $c^4$, and $c^5$ secured on the same shafts operate the gear wheels $g$, $g^1$, and $g^2$, arranged abreast of the gear wheel $a$ and engaging the latter.

It will be seen that the belt extends or is trained about the idler and geared pulleys, alternately. It will be seen that a progressive loading of the pulley insuring safety of operation is attained.

Many different forms of execution of the invention are possible.

What I claim as new and desire to secure by Letters Patent is:

1. A belt transmission device comprising in combination, a driving and a driven shaft, a pulley for one of said shafts, a pinion for the other shaft, a group of pulleys disposed adjacent said pinion, some of the pulleys of said group being geared to the pinion and the remainder being free therefrom, and a belt trained about the first named pulley, and about said group of pulleys, substantially as described.

2. A belt transmission device comprising in combination, a driving shaft and a driven shaft, a pulley for one of said shafts, a pinion for the other shaft, a plurality of pulleys geared to said pinion, a plurality of idler pulleys, and a belt trained about said first named pulley and about the idler and geared pulleys, substantially as described.

In testimony whereof I affix my signature in presence of two witnesses.

EMMA BOESNER.

Witnesses:
 FRANZ ROPPLONE,
 PETER WEBER.